United States Patent [19]

Taylor

[11] 4,230,234
[45] Oct. 28, 1980

[54] METER BOX ASSEMBLY

[76] Inventor: James B. Taylor, P.O. Box 814, Jeffersonville, Ind. 47130

[21] Appl. No.: 37,320

[22] Filed: May 9, 1979

[51] Int. Cl.³ .................. B65D 25/20; B65D 8/04; B65D 8/14; B65D 6/26
[52] U.S. Cl. .................. 220/18; 220/4 C; 220/4 F; 220/8
[58] Field of Search .................. 220/8, 18, 4 R, 4 C, 220/4 D, 4 E

[56] References Cited

U.S. PATENT DOCUMENTS

| | | | |
|---|---|---|---|
| 193,686 | 7/1877 | Bowers | 220/8 |
| 321,483 | 7/1885 | Burrows | 220/8 |
| 1,907,775 | 5/1933 | Flook | 220/18 |
| 2,601,056 | 6/1952 | Rapisarda | 220/18 |
| 3,263,853 | 8/1966 | Smith | 220/18 |
| 3,369,321 | 2/1968 | Blackstone | 220/18 |
| 3,392,867 | 7/1968 | Morris | 220/18 |
| 3,674,169 | 4/1972 | Miller | 220/18 |
| 3,837,521 | 9/1974 | Huston et al. | 220/3.3 |
| 3,843,013 | 10/1974 | Brooks, Jr. | 220/55 K |
| 3,952,908 | 4/1976 | Carson | 220/18 |
| 3,972,440 | 8/1976 | Warren | 220/18 |

OTHER PUBLICATIONS

AMETEK Technical Bulletin 74-5u; 74-4u.
The Ford Meter Box Co. Inc., Catalog 70, Sections C-3, D-2, E & F-1.
Plastic Meter Setting Device, The Ford Meter Box Co. Nos. 1155 and 1156, No. 32 Typex Cover, The Ford Meter Box Co.
Tri-Setter, The Ford Meter Box Co.

Primary Examiner—George E. Lowrance
Attorney, Agent, or Firm—Finnegan, Henderson, Farabow, Garrett & Dunner

[57] ABSTRACT

Meter box apparatus for containing and securing an underground utility meter, including a cylindrical meter box for use as a meter pit, the meter box being fabricated in two complementary sections of substantially semicircular cross section with diametrically extending flanges, the flanges being held together by C-clamps for assembling the two sections, a meter box cover including a cylindrical body, the cylindrical body being insertable into the cylindrical meter box, both the box and the cover having complementary threads molded into the walls for adjusting the height of the apparatus, and an apertured bar adjustably positionable with respect to the height of the meter box and secured between said two sections for securing the meter.

14 Claims, 10 Drawing Figures

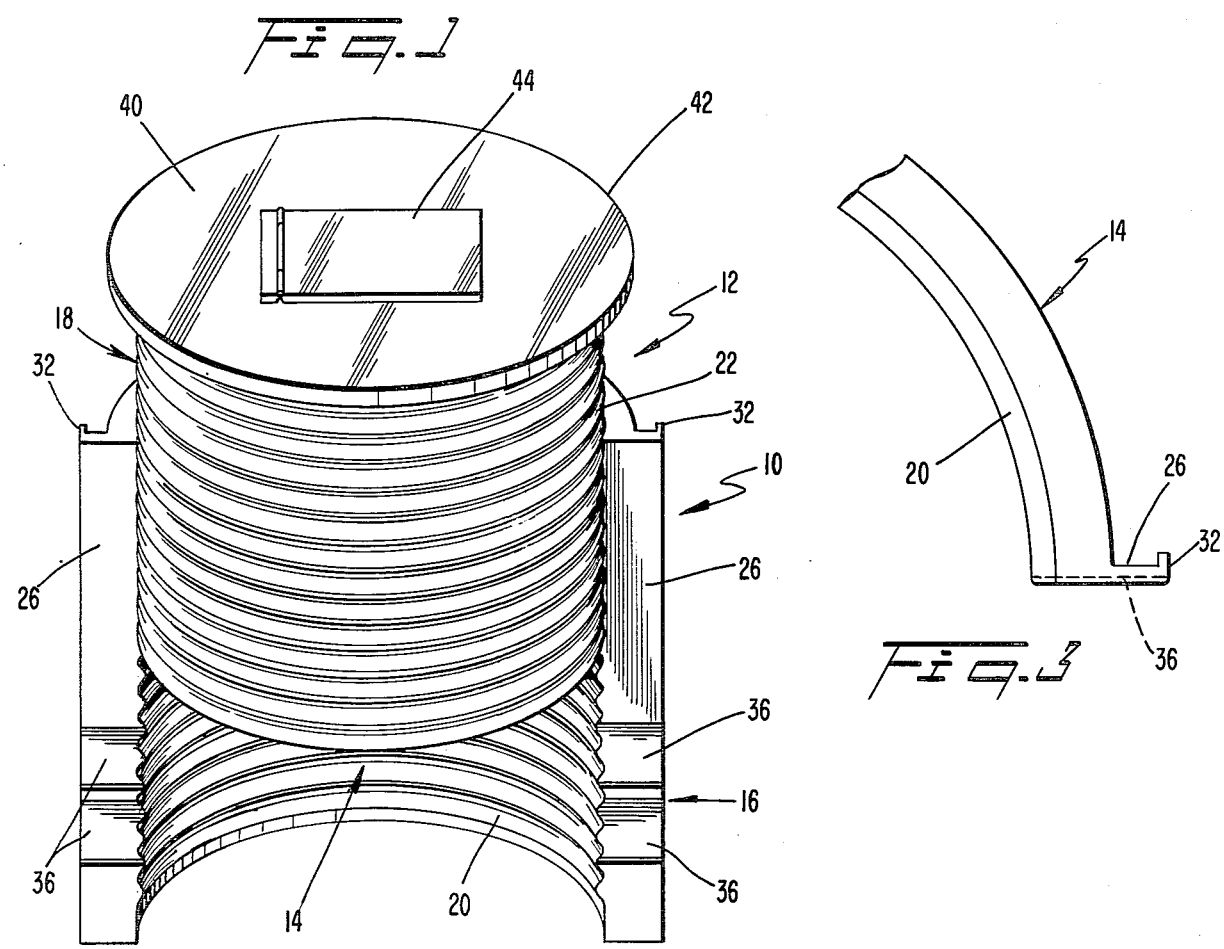
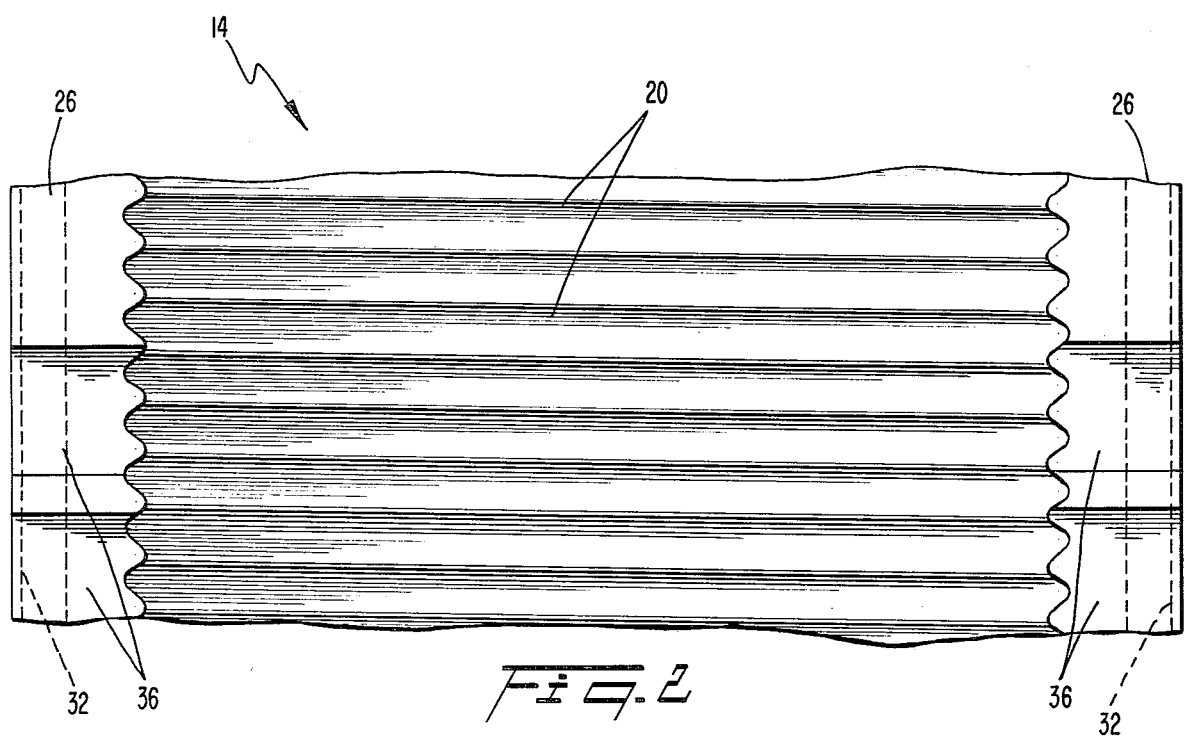

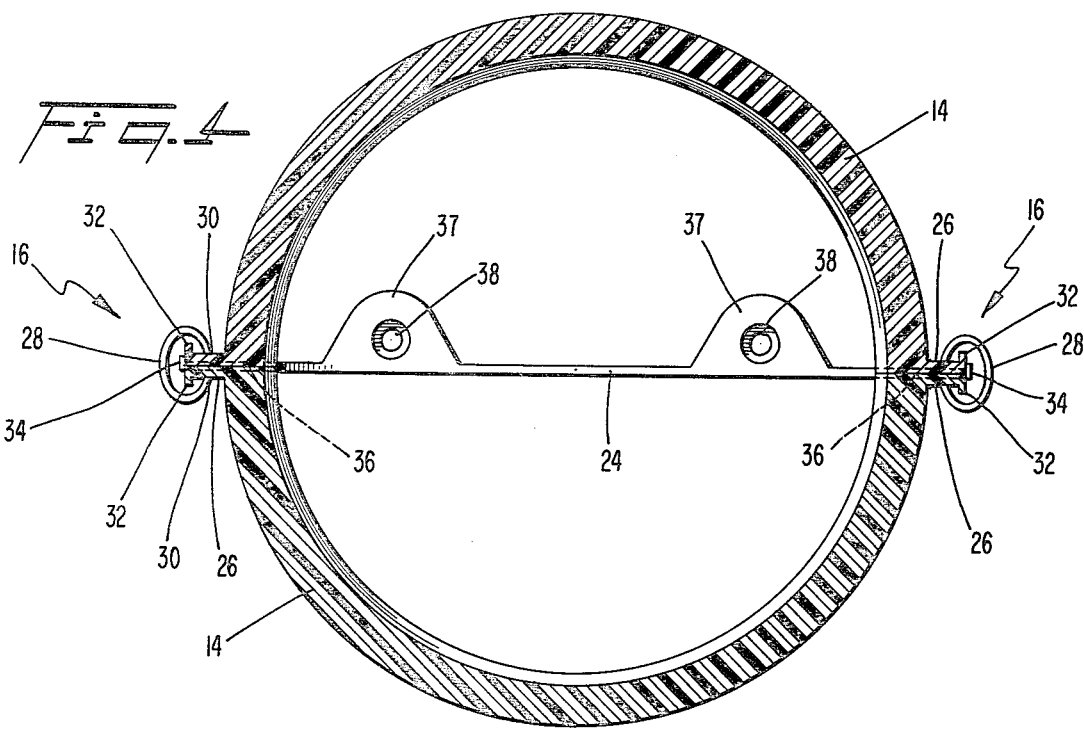
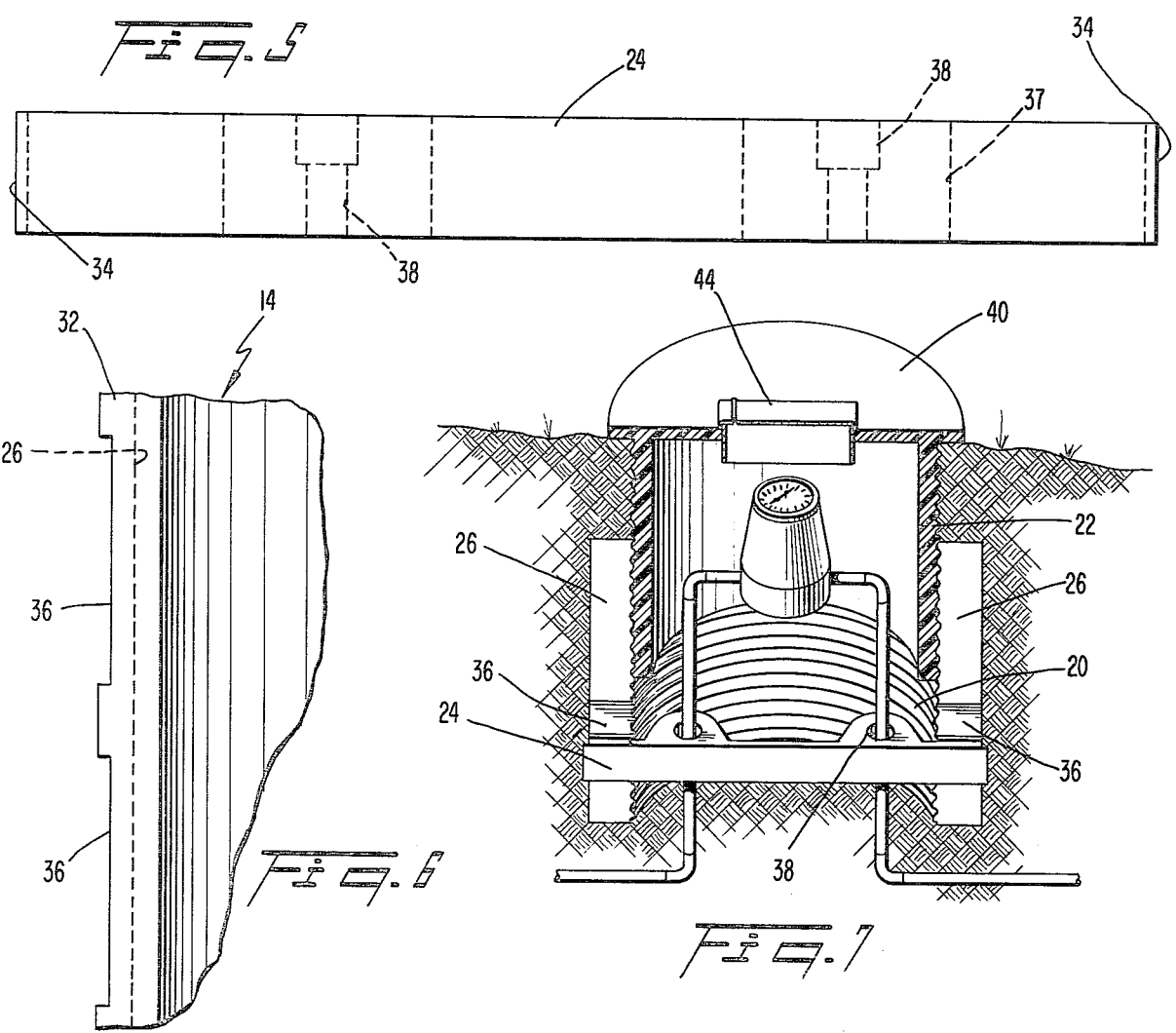

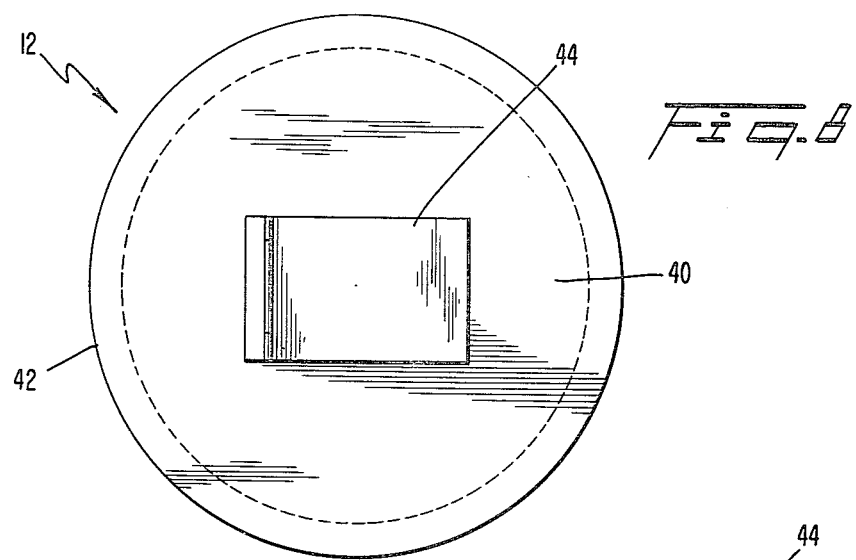
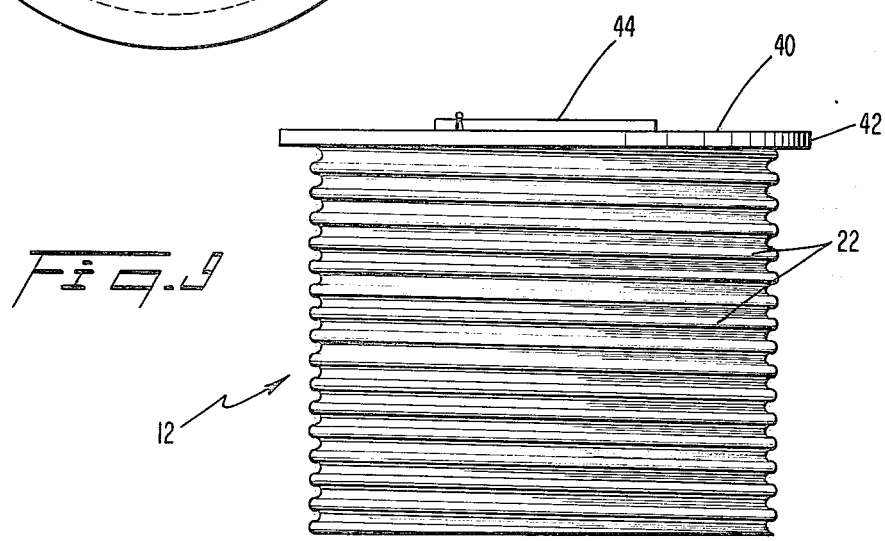
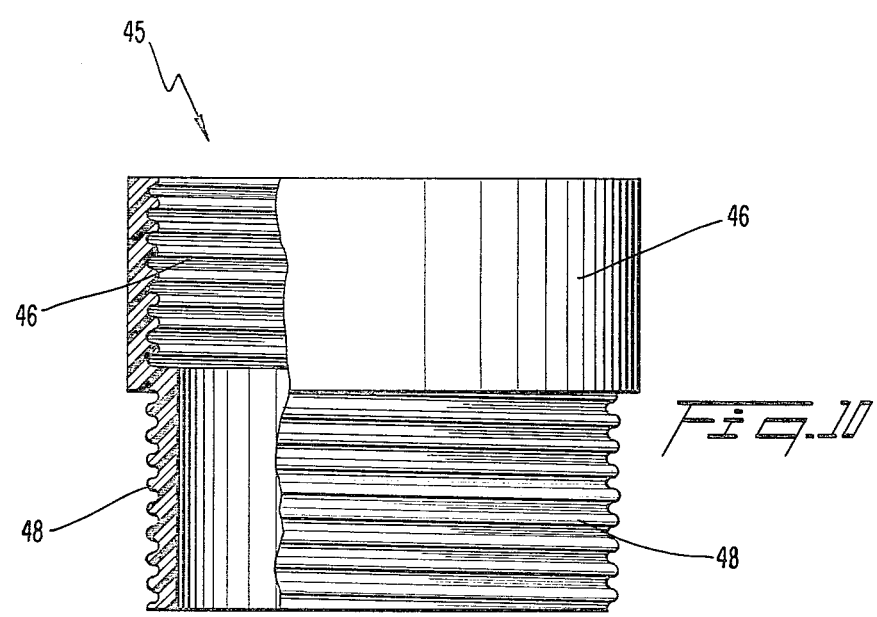

METER BOX ASSEMBLY

BACKGROUND OF THE INVENTION

This invention relates to meter box apparatus for containing and securing an underground utility meter, or other utility device, and more particularly, to such apparatus providing adjustability of the height of the apparatus.

It is conventional to bury utility lines, such as water lines, below the frost line of the earth and to provide meter boxes at appropriate positions for checking the volume of the fluid which has passed through the meter. The depths at which the utility lines must be buried to avoid freezing obviously varies greatly between southern and northern latitudes. Since the meter and its connections must be accessible from the surface, the height of the meter box apparatus must vary considerably to allow the top of the apparatus to be substantially level with the grade. It has also been found that the grade level tends to vary with time and more particularly, with changes in the surfacing of streets. It is apparent, therefore, that the height of the meter box apparatus must not only be adjustable as to the time when the meter is installed but preferably as the grade level may change from time to time.

As the height of the apparatus is varied to accommodate different frost lines, the height of the meter may also need to be adjusted with respect to the box to permit readability of the meter from the surface or prevent its freezing.

Meter box apparatus for containing and securing a utility meter ordinarily includes a box forming a meter pit fabricated of concrete, cast iron, or other such heavy materials. It is, however, known to fabricate such boxes of plastic, such as polyolefin.

It is also known to fabricate such apparatus to include two cast iron barrels which telescope by means of threads on the outer surface of the lower barrel and on the inner surface of the upper barrel. Although such apparatus provides axial adjustability, the components are expensive to make, and are extremely heavy, being therefore expensive to ship and difficult to handle.

As suggested above, it is also desirable that devices for securing the meter at a readable level should be adjustable with respect to the height of the box. It is customary, however, for the devices securing the meter, such as copper meter setters, to be fixed in height at the time of the manufacture of the apparatus. Such apparatus is therefore customarily manufactured for use in a specific latitude and the height of the meter predetermined with respect to the height of the meter box.

To reduce the cost of positioning the meter, it is sometimes attached to the service lines without further support or clamping in position. When a meter is serviced or changed under these conditions, not only does the position of the meter tend to be changed, but the service pipe can be damaged with resulting leak.

SUMMARY OF THE INVENTION

It is therefore an object of the present invention to provide meter box apparatus which is less cumbersome to ship and easier to handle on installation.

It is also an object of the invention to lighten the weight of meter box apparatus.

It is further object to maximize the height adjustability of the apparatus.

It is still a further object of the invention to be able to adjust the height of the meter with respect to the meter box and eliminate the need for a prefabricated copper meter setter.

It is also an object of the invention to reduce the expense of positioning and containing the service pipes, while still aiding in the support of the weight of the meter, valves and couplings.

Additional objects and advantages of the invention will be set forth in part in the description which follows, and in part, will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the meter box apparatus for containing and securing an underground utility meter comprises a cylindrical meter box for use as a meter pit, the meter box being fabricated in two complementary sections of substantially semicircular cross section and including means for assembling the two sections; a meter box cover including a cylindrical body, the cylindrical body being insertable into the cylindrical meter box; mutually interacting means respectively integral with the meter box and cover for adjusting the height of the apparatus; and meter securing means adjustably positionable with respect to the height of the meter box and secured between the two sections.

Preferably, the meter box is vacuum-molded of polyethylene, the mutually interacting means include complementary threads formed as convolutions in the walls of the sections of the meter box and the cylindrical body, and the assembling means includes diametrically extending flanges on the complementary sections, and a pair of elongated resilient tubular C-clamps, each surrounding a pair of aligned flanges with the edges of the C-clamps abutting the outer surfaces of the flanges.

Also preferably, the meter-securing means includes a panel extending diametrically across the meter box, the ends of the panel being clamped between the pairs of aligned flanges, the panel having a predetermined width, and the flanges on at least one of the sections including aligned and spaced indentations for selectably receiving the width of the panel therein.

The panel preferably includes an integral platform substantially perpendicular to the axis of the cylindrical meter box, the platform including means for receiving and retaining the service lines to the meter.

The accompanying drawings, which are incorporated in and constitute a part of the specification, illustrate at least one embodiment of the invention and, together with the description, serve to explain the principles of the invention.

BRIEF DESCRIPTION OF THE DRAWINGS

FIG. 1 is a perspective view of a partially assembled meter box apparatus in accordance with the principles of the invention;

FIG. 2 is a front view of a portion of one of the substantially semi-circular sections of the meter box of the apparstus of FIG. 1;

FIG. 3 is a top view of one end of the section of FIG. 2;

FIG. 4 is a top view of the meter box of FIG. 1;

FIG. 5 is a side view of the meter-securing panel shown in FIG. 4;

FIG. 6 is a partial end view of a flange on a section, showing indentations for selectably receiving an end of the panel of FIG. 5;

FIG. 7 is a perspective view of the meter box assembly of FIG. 1 partially broken away to show a service line's retainer and meter spacing guide for meter placement in accordance with the principles of the invention;

FIG. 8 is a top view of the meter box cover of FIG. 1;

FIG. 9 is a side view of the meter box cover of FIG. 8; and

FIG. 10 is an auxiliary height extender for the apparatus of FIG. 1.

DESCRIPTION OF THE PREFERRED EMBODIMENT

Reference will now be made in detail to the present preferred embodiment, an example of which is illustrated in the accompanying drawings.

Meter box apparatus for containing and securing an underground utility meter generally includes a meter box for use as a meter pit and a meter box cover. As illustrated in FIG. 1, the meter box apparatus includes a meter box, numbered generally as 10, and meter box cover numbered generally as 12.

In accordance with the invention, the meter box is cylindrical and is fabricated in two complementary sections of substantially semicircular cross section, and includes means for assembling the two sections. As embodied herein and illustrated in FIG. 1–4, the meter box 10 is a right circular cylinder and is fabricated in two complementary sections 14 of substantially semicircular cross section.

The means, numbered generally as 16, for assembling the two sections 14 of the meter box 10 will be described in detail with respect to FIG. 4.

The meter box cover 12 includes a cylindrical body 18 which is insertable into the meter box 10. The two complementary sections 14 and a cover 12 include mutually interacting means for adjusting the height of the apparatus. In accordance with the invention, the interacting means are complementary threads formed as convolutions in the walls of the sections of the meter box and the cylindrical body. As embodied herein and shown particularly in FIG. 1 and 2, the convolutions 20 in the complementary sections 14 are formed by molding the walls to form the threads as an integral part of the section. These convolutions serve not only as threads for adjusting the height of the apparatus but also serve to restrain the meter box from sinking into the ground. The threads 22 on the meter box cover are also molded into the walls of the cylindrical body 18 of the cover 12 and sized for rotation into and out of the meter box 10.

Preferably, at least the sections of the cylindrical meter box are fabricated from plastic and more particularly these convolutions are vacuum-molded out of polyethylene. It is, of course, apparent that the meter box need not be vacuum-molded and may be fabricated of other well-known plastics such as polystyrene, polyolefins and acrylonitrile-butadiene-styrene.

The meter box may be fabricated in any convenient size depending on the size of the meter and the necessity for personnel to have manual access to the meter. For most uses, however, it has been found that a convenient size meter box is 24" high with an inside diameter of about $17\frac{3}{4}"$, and the pitch of the threads about $2\frac{3}{4}"$. In the preferred embodiment, the polyethylene of the vacuum-molded walls is 0.12" thick.

In accordance with the invention, the meter box apparatus includes meter-securing means adjustably positionable with respect to the height of the meter box and secured between the two complementary sections. The meter-securing means will be described in detail as illustrated in FIGS. 5–7.

As stated above, the meter box of the invention includes means for assemblying the two complementary sections 14 of the meter box 10. As embodied herein, the assembling means includes diametrically extending flanges 26 on the complementary sections 14, a pair of elongated resilient tubular C-clamps 28, (FIG. 4), each surrounding a pair of the aligned flanges, the edges 30 of the C-clamps abutting the outer surfaces of the flanges 26.

Diametrically extending flanges 26 of a width of approximately $2\frac{1}{4}"$ have been found to be very satisfactory with a meter box of 24" height and $17\frac{3}{4}"$ inside diameter. The tubular C-clamps 28 may be of any convenient diameter and are also fabricated of plastic, preferably polyethylene. The C-clamps will be substantially of the same length as the height of the meter box 10. After alignment of the flanges of the complementary sections 14, the C-clamp 28 may be applied to surround the pair of the aligned flanges. Preferably, each of the flanges 26 includes an edge portion 32 turned outwardly from the plane of the flange. The outwardly turned edged portions 32 prevent the C-clamps 28 from accidental disengagement with the flanges 26 and the disassembly of the meter box.

The fabrication of the meter box in two complementary sectons 14 greatly reduces the problems of shipping and handling the meter box. The sections can be nested for shipping and are much less cumbersome for handling on the side of use. In addition, they can be assembled easily at the site of use without special tools.

By fabricating the sections of plastic, preferably polyethylene, the weight of the meter box is greatly reduced while retaining insulating value for prevention of freezing of water lines, for example, extending upwardly in the meter box. The cylindrical shape of the meter box, on the other hand, gives the meter box great structural strength and rigidity.

By vacuum-molding the meter box, in the preferred embodiment, from polyethylene the convolutions forming the threads are formed directly in the walls, whereby the threads themselves serve to restrain settling of the meter box by interaction with the surrounding earth.

As stated previously, the meter box apparatus of the invention includes meter-securing means adjustably positionable with respect to the height of the meter box and secured between the sections of the meter box. As embodied herein, the meter-securing means includes a panel 24 extending diametrically across the meter box 10 and having its ends clamped between the pairs of aligned flanges 26.

Preferably, the ends of the panel 24 extend slightly beyond the outwardly turned edges 32 of the flanges 26 and each of the extending ends includes an edge portion 34 outwardly turned from the plane of the panel 24. The assembled aligned flanges 26 with the respective ends of the panel 26 there between are then clamped together by the C-clamps 28.

As embodied herein, the panel 24 has a predetermined width and the flanges 26 of at least one of the sections 14 include aligned and spaced indentations 36 (FIG. 6) for selectably receiving the width of the panel. In the illustrated embodiment, the panel 24 is 2" wide with an inch space between the indentation 36. The height of the panel 24 with respect to the meter box is therefore adjustable in 3" spacing.

Although the panel 24 is illustrated as having a 2" width with 1" spacing between the indentations 36, the width of the panel can be changed as convenient for various diameters of the meter box and weights of meters.

The height adjustability of the meter-securing means with respect to the meter box, as the box is being assembled at the site of use, therefore, affords great flexibility in the proper positioning of the meter for reading. Changes in the grade can be taken into account easily while the level of the buried utility line remains relatively constant.

The height adjustability of the meter-securing means also greatly reduces manufacturing and inventory storage costs, since the apparatus of the invention can be used for a number of different latitudes, with differing frost lines, with a single standard size of meter box.

It is, of course, apparent that the meter box of the invention can be removed from the grounds, disassembled and the height of the panel repositioned as required when the meter box is reassembled.

In accordance with the invention, as embodied herein, the panel includes an integral platform 37 extending outwardly from the panel so as to be substantially perpendicular to the axis of the cylindrical meter box. The platform 37 includes means for receiving and retaining the service lines to the meter. As embodied herein, the means for receiving and retaining the service lines to the meter include apertures 38 in the platform which are shaped as sockets to receive the connection joints of the service lines wherein the meter is attached to the service lines. As particularly shown in FIG. 7, the panel 24 with its platforms 37 and apertures 38 serves as a service line retainer and meter spacing guide for the utility meter.

The cover 12 includes an integral lid 40 having an outwardly extending rim 42 (FIG. 8). The rim 42 will ordinarily rest on the surface of the surrounding grade and helps to prevent the meter box assembly from settling into the earth. When used with a meter box having an internal diameter of 17¾", the lid 40 is preferably 22" in diameter with an extending rim 42 having a width of ½".

Preferably the cover 12 is molded in a single piece from polyethylene. The cover may, of course, also be fabricated of other well-known plastics, such as polystyrene.

The cylindrical body 18 of the meter box cover 12 telescopes into the meter box 10 by means of the convoluted threads 20, 22 interacting between the cover and the meter box. As such, the internal diameter of the cylindrical body of the cover for a meter box having a 17¾" inner diameter and 2½" pitch of the threads will be about 15¼". The height of the cylindrical body can vary as convenient, but in apparatus using a meter box of 24" height, the height of the cylindrical body of the cover is preferably about 12".

Any known means may be used for reading the meter through the meter box cover, such as flap 44. The flap 44 can be attached to the lid 40 by male and female fasteners, grommets or other known devices.

In some circumstances, the grade level may rise above the level of the buried utility lines requiring a height of apparatus greater than that provided by a standard meter box and meter box cover. In accordance with the invention, the apparatus may also include an extender collar 45 as shown in FIG. 10 which is threaded for receiving the cylindrical body of the cover in one end 46 and for being received in the meter box at the other end 48. It is apparent that the internal diameter of the end 46 will be substantially the same as the internal diameter of the meter box and the internal diameter of the end 48, telescoping into the meter box 10, will be substantially the same as the internal diameter of the cylindrical body 18 of the meter box cover 12.

The extender collar can be of any convenient height. For apparatus including a meter box of 24" height and a meter box having a cylindrical body of 12" height, it is preferred that the extender collar 45 have a total height of about 12", the ends 46, 48 each having a height of 6".

It is apparent that the meter box apparatus of the invention has great flexibility as to overall height and as to the height of the meter in the meter box. The apparatus is relatively light in weight, while being sufficiently rugged for its required use with improved shipping and storing economy.

What I claim is:

1. Meter box apparatus for containing and securing an underground utility meter, the apparatus comprising:
    a cylindrical meter box for use as a meter pit, said meter box being fabricated in two complementary sections of substantially semicircular cross section and including means for assembling the two sections;
    a meter box cover including a cylindrical body, said cylindrical body being insertable into said cylindrical meter box;
    mutually interacting means respectively integral with said meter box and said cover for adjusting the height of said apparatus; and
    meter-securing means adjustably positionable to selectable, predetermined positions with respect to the height of said meter box and secured between said two sections.

2. The meter box apparatus of claim 1 wherein said interacting means are complementary continuous threads formed as convolutions in the walls of said sections of the meter box and said cylindrical body.

3. The meter box apparatus of either of claim 1 or 2 wherein said sections are plastic.

4. The meter box apparatus of claim 3 wherein at least said meter box is vacuum-molded polyethylene.

5. The meter box apparatus of claim 1 wherein said assembling means includes diametrically extending flanges on said complementary sections, a pair of elongated resilient tubular C-clamps each surrounding a pair of aligned flanges, the edges of the C-clamps abutting the outer surfaces of the flanges.

6. Meter box apparatus for containing and securing an underground utility meter, the apparatus comprising:
    a cylindrical polyethylene meter box for use as a meter pit, said meter box being vacuum-molded in two complementary sections of substantially semicircular cross sections;
    means for assembling said two sections including diametrically extending flanges on said complementary sections, a pair of elongated resilient, tubular C-clamps each surrounding a pair of aligned flanges, the edges of the C-clamps abutting the outer surfaces of the flanges;

a meter box cover including a cylindrical body, said cylindrical body being insertable into said cylindrical meter box;

convolutions in the walls of said complementary sections and said cylindrical body forming continuous complementary threads for telescoping said meter box and said meter box cover; and meter-securing means adjustably positionable to selectable, predetermined positions with respect to the height of the meter box and secured between said two sections.

7. The meter box apparatus of claim 6 wherein said meter-securing means includes a panel extending diametrically across said meter box, the ends of said panel being clamped between said pairs of aligned flanges.

8. The meter box apparatus of either of claims 6 or 7 wherein each of said flanges includes an edge portion turned outwardly from the plane of its flange.

9. The meter box apparatus of claim 8 wherein the ends of said panel extend slightly beyond said edge portions and wherein each of said extending ends includes an edge portion outwardly turned from the plane of the panel.

10. The meter box apparatus of claim 7, wherein said panel has a predetermined width and wherein the flanges on at least one of said sections include aligned and spaced indentations for selectably receiving the width of said panel therein.

11. The meter box apparatus of either of claims 7 or 10 wherein said panel includes an integral platform substantially perpendicular to the axis of the cylindrical meter box, said platform including means for receiving and retaining the service lines to the meter.

12. The meter box apparatus of claim 1 wherein said cover includes an integral lid portion having an outwardly extending rim.

13. The meter box apparatus of claim 2 also including an extender collar threaded for receiving said cylindrical body in one end and for being received by the meter box at the other.

14. The meter box apparatus of claim 2 also including an extender collar threaded for being received by the meter box.

* * * * *